Aug. 30, 1927.
S. DAWSON
1,641,125
LUBRICATING SYSTEM
Filed Dec. 27, 1921
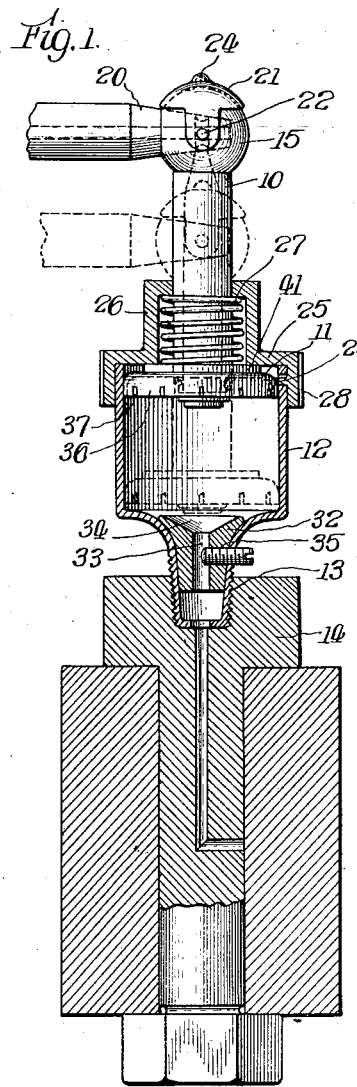
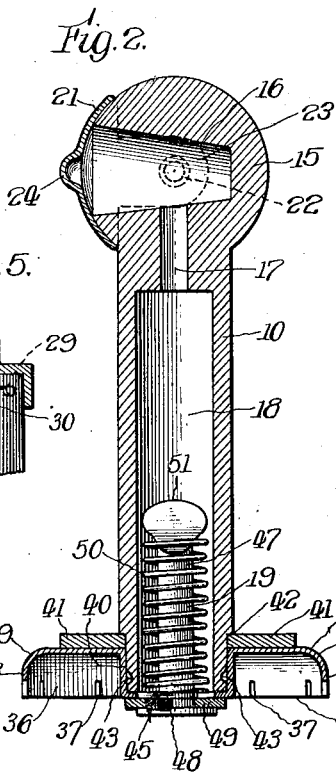
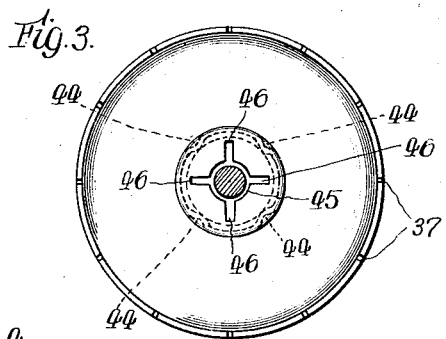
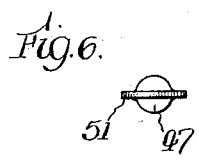
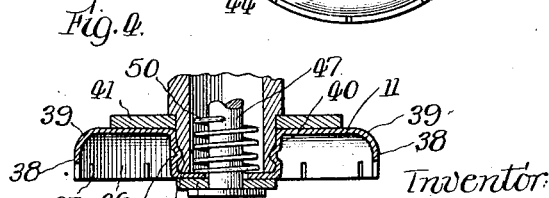

Patented Aug. 30, 1927.

1,641,125

UNITED STATES PATENT OFFICE.

SIDNEY DAWSON, OF CHICAGO, ILLINOIS, ASSIGNOR, BY DIRECT AND MESNE ASSIGNMENTS, TO EDWARD J. MORSE, OF CHICAGO, ILLINOIS.

LUBRICATING SYSTEM.

Application filed December 27, 1921. Serial No. 525,111.

The invention relates to lubricating systems embodying a device applicable for association with a bearing to be lubricated, in which there are employed a cup or container for the lubricant and a plunger or piston in the cup. The cup is filled by means of a grease gun or force pump which is removably attached to the piston rod or stem. The piston and the piston stem are designed to permit the passage of lubricant therethrough into the cup. The piston is moved by the inflowing lubricant to a position from which it is automatically moved by the action of a suitable spring and causes the discharge of the lubricant from the cup as the lubricant is consumed at the bearing.

The device which is herein described bears a relation to the structures shown and described in my copending applications for patent which were filed December 2. 1920, and given Serial Numbers 427,672 and 427,673, respectively.

The present invention consists of various details of construction which aid in simplifying the construction, which increases the efficiency thereof, and which materially reduce the cost of manufacturing the device.

It is an object of the invention to provide a simple and permanent connection between the piston and the piston stem, and to provide a valve adjacent this connection between the piston and the piston stem, to control the flow of lubricant through the stem.

It is a further object of the invention to provide a device of this character with a plunger or piston having a peripheral flange and having flange portions which are movable relatively to each other and relatively to the remainder of the piston so that a close fit and contact may be maintained between the piston and the inner face of the wall of the lubricant container in which the plunger or piston is reciprocally mounted. The container is designed to be drawn into form which consequently results in that an uneven or rough surface is produced, which would permit the escape of some of the lubricant between the piston and the wall of the container. The peripheral flange and the relatively movable flange portions of the piston closely fit against the inner face of the wall of the container and compensate for the uneven surface, and thereby prevent the escape of the lubricant between the piston and the container.

It is a further object to provide the container, which is formed of a relatively thin gaged material, with a means whereby a valve may be associated therewith to regulate the flow of lubricant from the container to the bearing. Because the threaded aperture in the bearing, with which the device is to be associated, is usually of a standard dimension, it is obvious that the connecting portion of the lubricating device whereby it is associated with the bearing must be of the proper dimension. Therefore, due to the fact that the cup or container is drawn of relatively thin material, a space is produced in the interior of this connecting portion which would not readily accommodate or permit a valve of simple construction to be associated therewith. It is, therefore, an object to provide a suitable element or plug which is capable of insertion into the interior of this portion of the container, which will allow the association of a valve at this point for the control thereby of the flow of lubricant from the container to the bearing to be lubricated.

It is an additional object of the invention to provide the device with an efficient means for preventing dirt, dust and other foreign substance from finding its way into the interior of the cup. This last mentioned means comprises a hood or cap with a projection thereon, whereby the hood may be readily engaged and moved to expose and enclose the opening with which the grease gun is adapted to be associated.

Another object of the invention is to provide means to permit the closure of the cup or container to be readily attached and detached when required.

The invention will be more readily understood when read in conjunction with the accompanying drawings which illustrate one embodiment of the invention, it being obvious that various changes and modifications may be employed without departing from the spirit of the invention as defined in the appended claims forming a part hereof.

In the drawings,

Figure 1 is a central section of a lubricating device constructed according to the invention, showing its attachment to the bearing to be lubricated;

Fig. 2 is an enlarged detailed sectional view of the piston and piston stem employed in the construction shown in Fig. 1;

Fig. 3 is an elevation of the lower end of the piston, the valve stem mounted therein being shown in section;

Fig. 4 is an enlarged detailed sectional view of the lower end of the piston and piston stem, showing in detail a means of connecting the piston and stem together, and also showing the valve in the piston stem which controls the flow of the lubricant;

Fig. 5 is an elevation of the upper end of the lubricant container, showing a means which may be employed for connecting the closure for the container relatively thereto; and Fig. 6 is a top or plan view of the valve stem which is mounted within the piston stem.

In the embodiment of the invention illustrated in the drawings, the use of a piston rod or stem 10, having the plunger or piston 11 and the cup or container 12 with a threaded extension 13, is contemplated. The threaded extension is provided to afford a means for connecting the device to the bearing 14 to be lubricated. As shown in the drawings, the upper end of the piston stem 10 is provided with an enlargement 15, having the tapered transversely arranged recess 16. The recess 16 communicates with the passage 17 which connects the recess 16 with the passage 18. The valve generally designated 19 controls the flow of lubricant from the passages 16, 17 and 18 into the interior of the cup 12 and also prevents the return of the lubricant into these passages during the period in which the lubricant is being discharged from the cup 12 and fed to the bearing 14. The tapered recess 16 is provided to permit the connection of the tapered end of a suitable grease gun 20, which when inserted in the recess and operated, forces the lubricant through the passages 16, 17 and 18 and into the cup.

A hood or cap 21, simulating a visor, is provided to prevent the introduction of dirt and dust into the interior of both the piston stem and the container. It is pivoted at 22 to the enlarged end 15 to permit of its being moved to expose and enclose the recess 16. The hood 21 is provided with arms 23. The arms 23 and the hood 21 conform to the shape of the spherical end 15 of the piston stem. The hood 21 is also provided with a knob or extension 24, which provides a finger piece whereby the hood 21 may be readily moved with relation to the recess 16.

As shown in the drawings, the lower end of the piston stem is provided with a piston 11, which is arranged for reciprocation within the cup or container 12. It is held in the container by means of the removable cap or closure 25 having the extension 26, which provide a housing for the coiled expansion spring 27. The spring 27 is arranged upon the piston stem so that one end bears against the piston 11 and the opposite end bears against the end of the extension 26 of the closure 25. The spring 27 is provided to force the piston and its associated members downwardly relatively to the container 12, and thereby cause the discharge of the lubricant from the container as it is consumed at the bearing 14.

The removable cap or closure 25 is further provided with an annular flange 28 having milling on its exterior periphery and having a plurality of inward projections 29, which cooperate with the adjacent end of the container 12, which is provided with a plurality of bayonet slots 30 into which the plurality of projections 29 are passed and then rotated with respect to the container which releasably locks the closure and the container together. The construction of the ends of the cup and closure therefor and the slots and projections is clearly illustrated in Figs. 1 and 5. It will be noted that a portion of the bayonet slot is provided with the inclined surface 31, which acts as a cam to hold the closure and the container against accidental separation.

The opposite end of the cup 12 is provided with the threaded extension 13. The aperture provided in the bearing with which this portion is designed to cooperate is usually of a standard dimension, and, as the container is formed of relatively thin gaged metal, the interior dimension of the threaded portion 13 will be relatively large, which might prevent the efficient application of a means for controlling the flow of lubricant therethrough. To compensate for this, a plug 32 is employed, which preferably conforms to the shape of the interior of the threaded portion.

As shown in the drawings, the plug 32 is flared at its upper end and is provided with the passage 33, which terminates at its upper end in a tapered recess 34. A valve 35 is in threaded engagement with the plug 32 and the material forming the extension 13. The valve 35 is arranged transversely to the passage 33 and may be manipulated to vary the dimension of the passage 33 adjacent the valve 35, thereby regulating the flow of lubricant from the container 12 through the passages in the plug 32, extension 13, and into the bearing 14.

It is manifest that as the lubricant is forced by means of the grease gun 20 through the passages 17 and 18, the valve generally designated 19, carried by the lower end of the piston stem 10, becomes unseated, which permits the lubricant to enter the lubricant cup or container 12 below the piston 11, the lubricant being simultaneously fed to the bearing. The resistance offered by the lubricant in the bearing causes the piston to be moved upwardly in the container 12, against the action of the coiled spring 27, which compresses the spring 27 so that the desired pressure will be exerted upon the lubricant by the piston to automatically feed it to the bearing as it is consumed thereat, and the resistance at this point lowered. The piston 11 is preferably formed of thin gaged metal so that it will afford the necessary flexibility and is constructed to provide one part of the valve generally designated 19. The piston is also constructed so that the periphery thereof may expand and produce a close fitting contact between it and the inner face of the container 12, which due to the fact that it is formed by being drawn into shape, produces irregularities and unevennesses which would ordinarily provide a space between the piston and the container between which the lubricant might escape and find its way above the piston, which would eventually become packed with lubricant at this point and prevent the proper operation of the device. To compensate for this and in order to maintain a close fitting connection between the piston and the container, and thereby prevent the escape of the lubricant, the lower portion of the piston is provided with a plurality of separated relatively movable portions 36, which are formed by severing the material forming the piston at suitable intervals by means of the plurality of slots 37. The slots 37 extend upwardly from the lower edge of the flange 38 and terminate a suitable distance below the juncture of the curved and vertical portions 39 and 38, respectively, of the piston 11. This structure produces a piston having portions which may expand or contract relatively to each other and also provides a portion 38 which will provide a continuous cylindrical surface intended to contact with the inner face of the container wall.

The metallic piston 11 is further formed to produce the depressed portion 40 into which the lower end of the piston stem 10 is adapted to be arranged. A reenforcing collar 41 is positioned between the piston 11 and the shoulder 42 provided by the cutting away of a portion of the end of the piston stem 10. The reenforcing collar adds strength to the piston and prevents its collapsing when pressure is applied to it, or by it, to the lubricant when acting to eject it from the container.

The piston stem 10 and the piston 11 are secured together by a simple construction which materially facilitates the connection of the end of the piston stem 10 and the piston 11. This is accomplished by providing the recess 40 of the piston with a plurality of indentations 44, which enter the annular recess 43 provided in the lower end of the piston stem 10.

The lower or bottom wall of the recess 40 is provided with an aperture 45 and the radially extending slots 46, through which the lubricant may pass from the passages in the piston stem into the container as it is forced therethrough by means of the pressure exerted thereon upon the connection and operation of the grease gun 20.

The valve generally designated 19 includes a stem 47, which has formed integrally with it, and at one end of it, the disc portion 48. A washer 49 is arranged on the stem and is seated between the disc portion 48 and the lower or bottom wall of the recess 40 of the piston. This disc portion 48 and the washer 49 are arranged adjacent the lower wall of the recessed portion 40 of the piston 11, so that they may normally close the aperture 45 and the radial slots 46 and prevent the escape of the lubricant from the container back into the piston stem, yet are operable upon actuation to permit the flow of the lubricant from the piston stem into the container 12, through the space then afforded between the valve 49 and the lower wall of the recessed portion 40.

The coiled spring 50 is arranged upon the stem 47 and reacts between the bottom wall of the recess 40 and the enlarged portion 51 of the stem 47, maintaining the valve 49 against the opposite side of the bottom wall of the recess and normally keeping the aperture 45 and the slots 46 closed. The operation of the valve structure generally designated 19 permits the flow of lubricant into the container 12, yet prevents its flow in the opposite direction.

The lubricating device is assembled in the following manner. The valve stem 47, which as yet has not had the flat enlarged portion 51 formed, is inserted into the washer 49. The stem is then inserted into the aperture 45 in the bottom wall of the recessed portion 40 of the piston 11. The spring 50 is placed over the stem 47 which protrudes through the piston 11. One end of the spring bears against the bottom of the recess 40. The spring 50 is then compressed to permit the formation of the flat portion 51 by any suitable tool. After the formation of the portion 51, compression of the spring is released and the spring then is in position to react between the bottom of the recess 40 and the flat portion 51. The piston stem 10 is inserted in the closure 25 with its extension 26. The spring 27 is placed around the portion of the piston stem opposite the enlarged portion 15. One end of the spring 27 bears against the end of the extension 26. The reenforcing collar 41 is then positioned on the piston stem 10, against the the shoulder 42 and against the other end of the spring 27, and compresses the spring. The stem 47, with its portion 51 and the spring 50, are then inserted into the passage 18. The associated piston 11 follows and the end of the piston stem 10, having the circumferential groove 43, is fitted into the recessed portion 40 of the piston. Thereupon, the pressure punch is applied to the recess wall 40, the indentations 44 are made and the piston 11 is secured to the piston stem. The cap 21 is secured in place and the device is ready for use.

Having thus described the invention, what I claim and desire to cover by Letters Patent is:

1. In a lubricating device, the combination of a lubricant container, a piston arranged in the container, said piston having a recessed portion, a piston stem, said piston stem having a passage through which the lubricant is passed into the container, a valve structure arranged in the recessed portion of the piston, a portion of said valve structure being adapted to be passed through the piston, said valve structure being provided with means to retain it in cooperative relation in said piston and piston stem, said means consisting of a valve stem having a valve at one end thereof on one side of the recessed portion of the piston, and a head at the other end thereof on the opposite side of the recessed portion of the piston and within said piston stem, and a spring coacting between said piston and said head.

2. In a lubricating device, the combination of a lubricant container, a piston arranged in the container, said piston being formed with a recessed portion having an aperture in the bottom of said recessed portion, a piston stem, said piston stem having a passage through which the lubricant is passed into the container, a valve stem in said aperture, which valve stem extends into said piston stem passage, said valve stem being provided at one end with a valve and at the other end with a head, said valve being arranged on one side of said recessed portion and said head being arranged on the opposite side of said recessed portion and within said passage, and a spring coacting with said head and the bottom wall of the recessed portion to close said valve and prevent return of the lubricant from said container to said passage.

3. In a lubricating device, the combination of a lubricant container, a piston arranged in the container, said piston being formed with a recessed portion having a centrally arranged aperture and a plurality of slots radiating from said aperture in the bottom of said recessed portion, a piston stem, said piston stem having a passage through which the lubricant is passed into the container, a valve stem in said aperture, which valve stem extends into said piston stem passage, said valve stem being provided at one end with a valve and at the other end with an integral enlarged portion, said valve being arranged on one side of said recessed portion and said integral enlarged portion being arranged on the opposite side of said recessed portion and within said passage, and a coiled spring coacting with said integral enlarged portion and the bottom wall of the recessed portion to close said valve and prevent return of the lubricant from said container to said passage.

4. A lubricating device having a lubricant container, a piston having a tubular stem, the head of the piston being arranged in the container, a valve associated with the piston, the stem of said valve being adapted to be passed through the piston head and terminating in the tubular stem of the piston, a spring for normally retaining the valve closed against the piston head, and said valve being operable by the lubricant to permit the introduction of lubricant to the container upon the passage of lubricant through the tubular stem of said piston.

In witness whereof, I have hereunto subscribed my name this 22nd day of November, A. D., 1921.

SIDNEY DAWSON.